United States Patent [19]

Glesmann

[11] Patent Number: 4,887,704
[45] Date of Patent: Dec. 19, 1989

[54] ODOMETER DISABLING SYSTEM AND CLUTCH THEREFOR

[76] Inventor: Herbert C. Glesmann, 6145 S. 102nd St., Omaha, Nebr. 68127

[21] Appl. No.: 324,609

[22] Filed: Mar. 17, 1989

[51] Int. Cl.⁴ .................. F16D 27/10; G01C 22/00
[52] U.S. Cl. ........................... 192/90; 192/84 C; 235/95 R; 235/96
[58] Field of Search ............... 192/90, 40, 84 R, 84 C; 235/95 R, 96, 97; 116/62.1; 73/490

[56] References Cited
U.S. PATENT DOCUMENTS

| | | | |
|---|---|---|---|
| 986,299 | 3/1911 | Lindemann et al. | 235/95 R |
| 1,081,934 | 12/1913 | Wessoleck | 235/96 X |
| 2,159,915 | 5/1939 | Van Wagenen | 235/95 R |
| 2,722,303 | 11/1955 | Utz | 192/90 |

*Primary Examiner*—Leslie A. Braun
*Assistant Examiner*—Richard M. Lorence
*Attorney, Agent, or Firm*—George R. Nimmer

[57] ABSTRACT

For use with an overland motor vehicle including therewithin a traversal-recording odometer that is actuatably connectable to the vehicular transmission, there is disclosed an odometer disabling system for disabling the odometer during time periods when the motor vehicle is being towed and during which it is inappropriate to record overland traversal of the towed vehicle.

There is a novel electrically-disengageable spring-actuated clutch intervening between the vehicular odometer and transmission and co-acting with and along the flexible-shaft connection between the odometer and transmission. The clutch has the capability of maintaining the traversal-recording integrity of the odometer only so long as electrical current is not being fed into the electrically powerable coil of the clutch.

Included within the clutch housing are: a rear-spindle having a fore-length in keyed relationship with a rearward portion of a magnetically-permeable tubular mover; a front-spindle freely rotatably extending into a forward portion of the tubular mover; a friction disc which at opposite sides thereof faces the tubular mover and a shouldered pressure cup; an appropriately configured spring whose pressure tends to tightly sandwich the friction disc between the tubular mover and pressure cup and whereby torque applied to the front-spindle causes rotation of the rear-spindle; and an electrically powerable coil which, when energized, overcomes the spring pressure at the friction disc and whereby torque applied to the front-spindle cannot cause rear-spindle rotation.

6 Claims, 2 Drawing Sheets

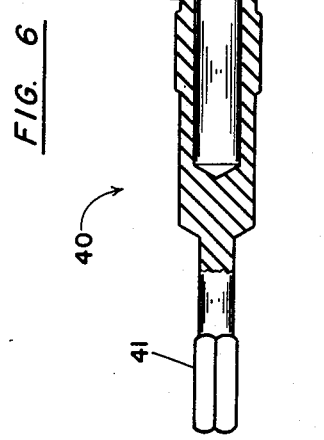
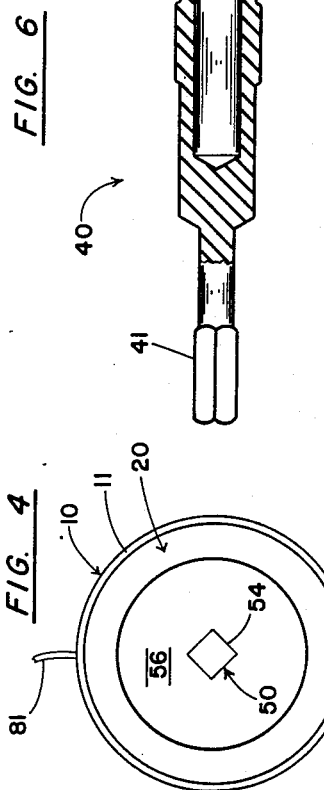
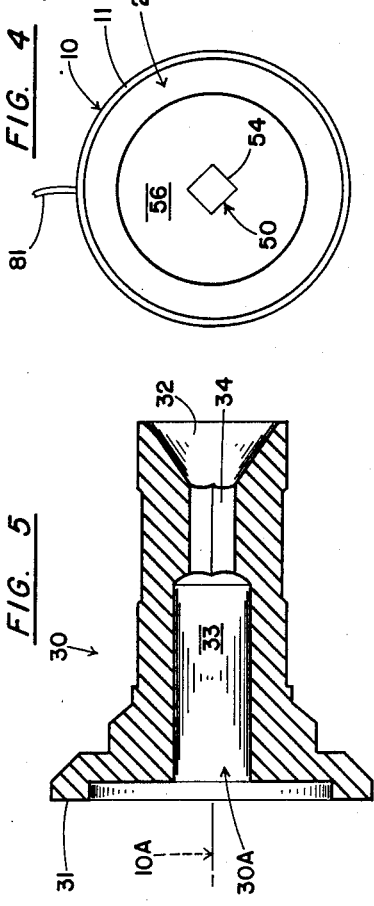
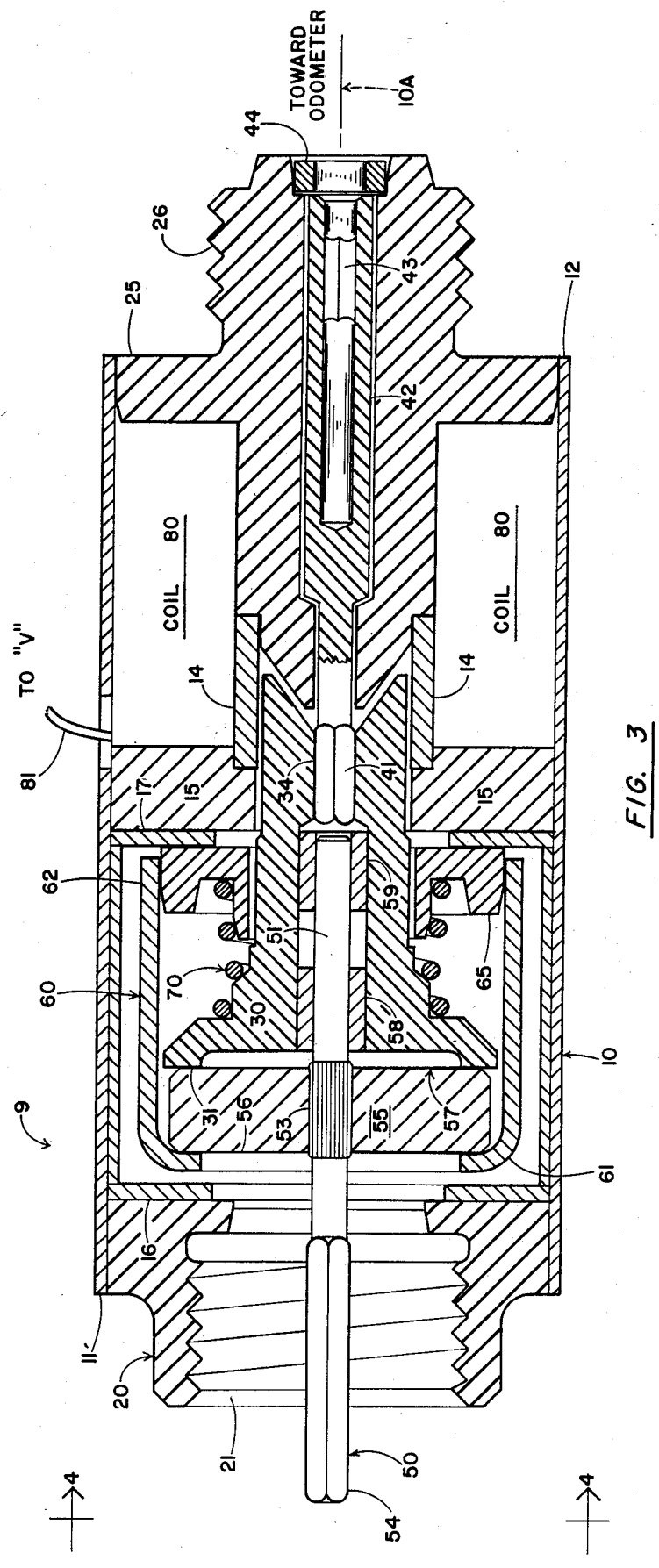

4,887,704

ODOMETER DISABLING SYSTEM AND CLUTCH THEREFOR

BACKGROUND OF THE INVENTION

Automobiles, trucks, and kindred overland traversing vehicles are usually equipped with a traversal-recording odometer that registers the miles or kilometers traversed along underlying terrain by the vehicle. Such overland traversal-recording is, of course, equal to the number of revolutions that a tire or other underlying vehicular wheel makes along the terrain, and arithmetically multiplied by the wheel circumference. Fed to the odometer through some transducer e.g. flexible-shaft means, etc., is said arithmetic product or some other value directly proportional thereto e.g. revolutions of vehicular transmission gearing.

Because odometer readings affect vehicular warranty provisions and re-sale values, it is considered fraudulent for a vehicle owner to intentionally disable the odometer or its transducer. But for certain temporary situations, such as whenever a vehicle is being towed, it is ethically appropriate to temporarily prevent the odometer from recording terrain traversal. For each such appropriate episode, it has been heretofore necessary for the vehicle owner to tediously and laboriously disconnect and then later reconnect the odometer or the transducer, both of which are obscurely located in the vehicle.

OBJECTIVE OF THE INVENTION

In view of the foregoing, it is the general objective of the present invention to provide a system for temporarily disabling a vehicular odometer during those temporary time periods when it is appropriate to do so, and which disabling system does not require tedious labor at the beginning and end of each temporary disablement period. It is an ancillary general objective to provide an odometer disabling system having a unique activator/deactivator clutch member that can be semi-permanently attached along the transmission/flexible-shaft/odometer mechanism, either in integral combination with or as a coupling for the flexible-shaft or similar transducer.

GENERAL STATEMENT OF THE INVENTION

With the aforementioed general objective in view, and together with other ancillary and specific objectives which will become more apparent as this description proceeds, the odometer disabling system of the present invention comprises a novel electrically-disengageable spring-actuated clutch intervening between the vehicular odometer and transmission and co-acting with and along the flexible-shaft or other transducer between the odometer and transmission. The clutch, which maintains the traversal-recording integrity of the odometer only so long as electrical current is not being fed into the clutch, includes therewithin: a rear-spindle having a forelength in keyed relationship with a rearward portion of a magnetically-permeable tubular mover; a front-spindle freely rotatably extending into a forward portion of the tubular mover; a friction disc which at opposite sides thereof faces the tubular mover and a shouldered pressure cup; an appropriately configured spring whose pressure tends to tightly sandwich the friction disc between the tubular mover and the pressure cup and whereby torque applied to the front-splindle causes rear-spindle rotation and preserves the odometer traversal-recording capability; and an electrically powerable coil which, when energized, overcomes the spring pressure at the friction disc and whereby torque applied to the front-spindle cannot cause rear-spindle rotation, thus disabling the odometer traversal-recording capability.

BRIEF DESCRIPTION OF THE DRAWING

In the drawing, wherein like characters refer to like parts in the several view, and in which:

FIG. 3 is a sectional elevational view of a representative clutch component for the odometer disabling system;

FIG. 4 is a clutch endward view as seen from the direction 4—4 of FIG. 3; and

FIGS. 5 and 6 are sectional elevational detail views of tubular mover and rear-spindle components, respectively, of the FIGS. 3 and 4 clutch.

DETAILED DESCRIPTION OF THE DRAWING

Figure 1:
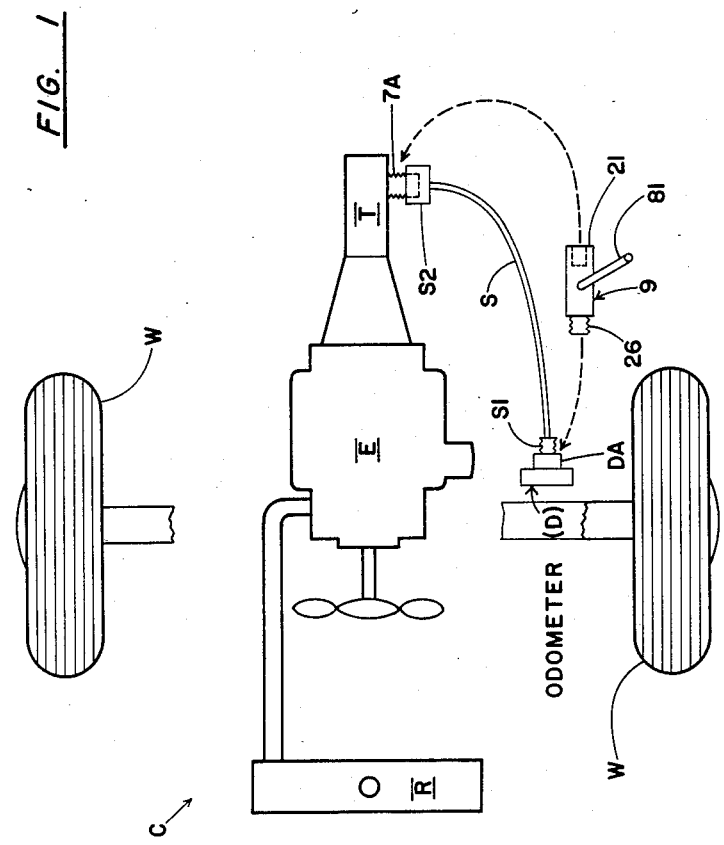
FIG. 1 schematically mechanically depicts an overland traversible motor vehicle, as a typical environment for the odometer disabling system of the present invention.
Figure 2:
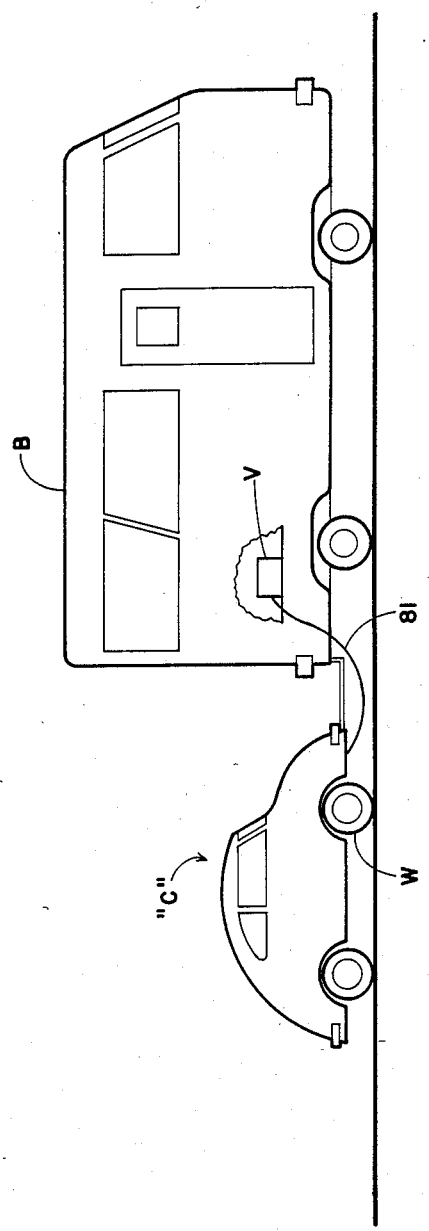
FIG. 2 pictorially depicts the FIG. 1 vehicle being towed and being internally provided with the clutch component of the odometer disabling system of the present invention.

In FIG. 1, "C" generally indicates an overland traversible motor vehicle including therewithin: internal combustion engine "E", radiator "R", terrain-contacting wheels "W", transmission "T", and traversal-recording odometers "D". Odometer "D" has an odometer-coupling "DA" that is actuatably connectable with flexible-shaft means "S" to a transmission-coupling "TA". Flexible-shaft "S" includes a first-coupling "S1" adapted to be removably connected to odometer-coupling "DA" and a second-coupling "S2" adapted to be removably connected to transmission-coupling "TA". FIG. 1 also indicates that an electrically-disengageable spring-actuated clutch (e.g. 9) can connectably actuatably intervene somewhere between the odometer-coupling and the transmission-coupling, and co-actuatable with and along the flexible-shaft means, whereby said clutch has the capability of disabling the odometer's traversal-recording function whenever electrical current ("V") is being fed (81) into the clutch. FIG. 2 illustrates the latter situation, namely: it being appropriate, during a towed vehicle situation ("C"), to disable the towed vehicle's odometers ("D"). A source of electrical current ("V") for feeding (81) into the clutch (9) during time periods when the vehicle is being towed, can be a chemical storage battery ("V") carried by the towed vehicle ("C") or by the towing vehicle ("B").

Representative embodiment 9 of the electrically-disengageable spring-actuated clutch of the present invention comprises a tubular housing 10 having a circular inside-wall 11 concentrically surrounding a longitudinally extending housing-axis 10A. Housing 10 has a pair of circularly annular ends surrounding and transversely intersecting housing-axis 10A including a front-end 11 and a rear-end 12. Substantially medially its said ends 11 and 12, housing 10 tightly securely surrounds an annular divider member 15 that divides the housing into forward and rearward regions. The said housing forward region tightly securely surrounds a pair of annular thrust bearings 16 and 17. With the housing rearward region there is an annular coil 80 of insulated electrically-conductive wire 81 that coilably surrounds a bushing 14 surrounding housing-axis 10A; this wire emerges through housing 10 for energization at some voltage source "V". Functioning as tightly surrounded closures for housing ends 11 and 12, and functionable as clutch-ends connectable along the odometer-to-transmission train, are tubular forward-member (20) and tubular rearward-member (25). The forward-member, which is adaptable for removable connection to a vehicular transmission-coupling "TA" or to the flexible-shaft first-coupling "S1", in selected embodiment 20 is provided with an internally threaded (21) front-nipple. The rearward-member, which is adaptable for removable connection to vehicular odometer-coupling "DA" or to the flexible-shaft second-coupling "S2", in selected embodiment 25 is provided with an externally threaded (26) rear-nipple.

Depicted in the FIG. 5 detail view as well as in the FIG. 3 assembly view, there is a forwardly outwardly flared (31) tubular mover 30 fabricated of ferrous or other magnetically-permeable structural material. As seen in FIG. 3 assembly view, tubular mover 30: surrounds housing-axis 10A; is normally spaced forwardly away from rear-member 25; and extends predominately forwardly and slightly rearwardly of divider member 15. Tubular mover rear-surface 32 converges forwardly toward housing-axis 10A. For the tubular mover bore 30A, forward portions (33) are of circular cross-sectional shape and rearward portions (34) are of rectangular or other noncircular cross-sectional shape.

Depicted in the FIG. 6 detail view as well as in the FIG. 3 assembly view, there is a rear-spindle 40 extending along the rearward region of housing-axis 10A. The rear-spindle fore-length 41 has a rectangular or other noncircular cross-sectional shape for providing a keyed relationship within the tubular mover bore rear part 34. Rear-spindle 40, at its rear-length 42, is provided with a bore 43 of rectangular or other noncircular cross-sectional shape and adapted to receive therewith a driving-pin e.g. a conventional odometer-pin. Retainer 44 maintains a longitudinal spatial relationship between rear-member 25 and rear-spindle 40.

Extending along housing-axis 10A and within the housing forward region, there is a front-spindle 50 which at its rearward length 51, and by virtue of bushings 58 and 59, rotatably extends into tubular mover forward portion 33. Front-spindle 50, at its forward length 54, is of rectangular or other noncircular cross-sectional shape and adapted to conventionally actuatably extend into a transmission-coupling "TA" or into a flexible-shaft first-coupling "S1". Medial length 53 of front-spindle 50 is splined so as to co-rotatably engage a friction disc 55 having a pair of transversely extending sides including a front-side 56 and a rear-side 57.

Located between said forward-member 20 and said divider member 15, there is a tubular pressure cup 60 surrounding housing-axis 10A and friction disc 55. Pressure cup 60 includes an annular rear-length 62 and an annular shoulder 61. Annular shoulder 61 confronts and is adapted to abut friction disc front-side 56, and the tubular mover forward flair 31 confronts and is adapted to abut friction disc rear-side 57. Securely frictionally engaged with the pressure cup rear-length 62 and surroundably spaced away from tubular mover 30 is an annular saddle member 65.

There are spring means (e.g. helical spring 70) tending to urge the tubular mover 30 away from the cup-retained saddle 65 and against friction disc rear-side 57 and also tending to urge friction disc front-side 56 against pressure cup shoulder 61. These abutment tendencies establish a spring-actuated normal condition for the clutch (9) wherein torque applied to front-spindle 50 causes sympathetic rotation of rear-spindle 40 around housing-axis 10A. This sympathetic rotation occurs according to the following co-rotational mechanical train:

(a) the front-spindle co-rotational (53) friction disc 55, at its abutting sides 56 and 57, causes pressure cup 60 and tubular mover 30 to co-rotate. Because of the presence of bearings 58 and 59, friction disc abutment with the pressure cup 60 and with tubular mover 30 is crucial to co-revolvability between front-spindle 50 and tubular mover 30; and (b) the co-rotationally keyed inter-relationship (34, 41) between tubular mover 30 and rear-spindle 40. For the purpose of enhancing torsional resistance among the pressure cup shoulder 61, the friction disc 55, and the tubular mover 30, the helical spring (70) is preferably tightly wrapped around said annular saddle 65 and said tubular mover 30.

Returning now to the annular electrical coil 80. During time periods when a source of electrical current (e.g. "V") is fed (81) into annular electrical coil 80, the thusly produced magnetic field attracts magnetically-permeable tubular mover 30 in the rearward direction (i.e. toward rearward-member 25), and hence, withdrawn from friction disc 55. Upon such magnetically induced withdrawal, there is established an electrically-disengaged condition for the clutch (9) wherein, and for reasons alluded to in the immediately preceeding paragraph, torque applied to front-spindle 50 cannot effect rotation of rear-spindle 40. Accordingly, during time periods when electrical current ("V") is being fed (81) into the clutch, the odometer ("D") will be disabled from recording overland traversal of the subject vehicle (e.g. towed vehicle "C").

Though the clutch (9) is most conveniently removably connected to the transducer (e.g. flexible-shaft "S") at a terminus thereof, and thereat also removably connected to the odometer-coupling ("DA") or to the transmission-coupling ("TA"), also possible is a unitary connection between a clutch embodiment and at an end, or even medially along, the transducer (e.g. "S").

From the foregoing, the odometer disabling system and clutch component therefor will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. For use with an overland traversible motor vehicle including therewithin a traversal-recording odometer having an odometer-coupling that is actuatably connectable with flexible-shaft means to a transmission-coupling of the vehicular transmission, an odometer disabling system adapted to disable the odometer during time periods when said motor vehicle is being towed, said odometer disabling system including an electrically-disengageable spring-actuated clutch portion connectably intervening between said odometer and transmission and co-acting with and along said flexible-shaft means, said clutch having the capability of maintaining the traversal-recording integrity of the odometer only so long as electrical current is not being fed thereinto and further including a source of electrical current for feeding into said clutch portion during time periods when said motor vehicle is being towed, said odometer disabling system at the clutch portion comprising:

(a) a tubular housing having an inside-wall surrounding a directionally longitudinally extending housing-axis and having a pair of end transversely intersection said housing-axis, including a front-end and a rear-end;

(b) securely surrounded by a medial portion of said housing, an annular divider that divides said housing into forward and rearward regions;

(c) securely retained at the relegated to the housing rearward region, a tubular rearward-member which is provided with a rear-nipple that is alternatively adapted for actuatably connecting to an odometer-coupling and to said flexible-shaft means;

(d) located forwardly and rearwardly of said divider and forwardly of said rearward-member, a forwardly outwardly flared and magnetically-permeable tubular mover surrounding said housing-axis, forward portions of the mover bore being of circular cross-sectional shape and rearward portions of the mover bore being of noncircular cross-sectional shape;

(e) extending along said housing-axis, a rear-spindle having a fore-length extending into and having a keyed relationship with the rearward portion of said tubular mover, the rear-spindle having a rear-length provided with a bore of noncircular cross-sectional shape and adaptable to receive therewithin an odometer-pin;

(f) extending along said housing-axis, a front-spindle rotatably extending into a forward portion of said tubular mover, said front-spindle at the forward extremity thereof having a noncircular cross-sectional shape for axially extending into said transmission-coupling;

(g) securely retained at said housing front-end and relegated to the housing forward region, a tubular forward-member which at the forward part thereof is provided with a front-nipple that is alternatively adaptable for actuatably connecting to said transmission coupling and to said flexible-shaft means;

(h) surrounding a medial portion of said front-spindle and co-revolvable therewith, a friction disc having a pair of transversely extending sides including a front-side and also a rear-side adapted to abut the fowardly flared portion of said mover;

(i) located between said forward-member and said divider, a pressure cup surrounding said friction disc and including a cup frontal shoulder adapted to abut the friction disc front-side, said cup also having an annular rear-length;

(j) securely retained at the pressure cup rear-length and relegated forwardly of said divider, a saddle revolvably surrounding said tubular mover;

(k) spring means tending to urge the tubular mover away from said retained saddle and against the friction disc rear-side and also tending to urge the friction disc front-side against the pressure cup frontal shoulder, and thereby tending to provide a spring-actuated clutch condition appropriate for odometer traversal-recording; and (l) located rearwardly of said divider and surrounding the rearward portion of said tubular mover, an electrically powerable coil and which upon the feeding of electrical current thereinto attracts the tubular mover away from the friction disc, and thereby providing an electrically-disengaged clutch condition that disables the odometer from traversal-recording.

2. The electrically-disengageable spring-actuated clutch of claim 1 wherein the tubular rearward-member is provided with an externally threaded rear-nipple and the tubular forward-member is provided with an internally threaded front-nipple.

3. The electrically-disengageable spring-actuated clutch of claim 1 wherein a rearward portion of said spring is wrapped around said saddle and a forward portion of said spring is wrapped around said tubular mover, and thereby cause torsional resistance urging the pressue cup frontal shoulder and the tubular mover forward flair toward the torsionally intervening friction disc.

4. For use with an overland motor vehicle including a traversal-recording odometer having an odometer-coupling that is actuatably connectable with flexible-shaft means to a transmission coupling of the vehicular transmission, an electrically-disengageable spring-actuated clutch adapted for temporarily disengaging said odometer from traversal-recording, and said clutch comprising:

(a) a tubular housing having an inside-wall surrounding a directionally longitudinally extending housing-axis and having a pair of ends transversely intersecting said housing-axis including a front-end and a rear-end;

(b) securely surrounded by a medial portion of said housing, an annular divider that divides said housing into forward and rearward regions;

(c) securely retained at and relegated to the housing rearward region, a tubular rearward-member which is provided with a rear-nipple that is alternatively adaptable for connecting to an odometer-coupling and to the second-coupling of a flexible-shaft;

(d) located forwardly and rearwardly of said divider and forwardly of said rearward-member, a forwardly outwardly flared aand magnetically-permeable tubular mover surrounding said housing-axis, forward portions of the mover bore being of circular cross-sectional shape and rearward portions of the mover bore being of noncircular cross-sectional shape;

(e) extending along said housing-axis, a rear-spindle having a fore-length extending into and having a keyed relationship with the rearward portion of said tubular mover, the rear-spindle having a rear-length provided with a bore of noncircular cross-sectional shape and adaptable to receive therewithin an odometer-pin;

(f) extending along said housing-axis, a front-spindle rotatably extending into a forward portion of said tubular mover, said front-spindle at the forward extremity thereof having a noncircular cross-sectional shape for axially extending into said transmission-coupling;

(g) securely retained at said housing front-end and relegated to the housing forward region, a tubular forward-member which at the forward part thereof is provided with a front-nipple that is alternatively adaptable for connecting to said transmission-coupling and to said flexible-shaft first-coupling;

(h) surrounding a medial portion of said front-spindle and co-revolvable therewith, a friction disc having a pair of transversely extending sides including a front-side and also a rear-side adapted to abut the forwardly flared portion of said mover;

(i) located between said forward-member and said divider, a pressure cup surrounding said friction disc and including a cup frontal should adapted to abut the friction disc front-side, said cup also having an annular rear-length;

(j) securely retained at the pressure cup rear-length and relegated forwardly of said divider, a saddle revolvably surrounding said tubular mover;

(k) spring means tending to urge the tubular mover away from said retained saddle and against the friction disc rear-side and also tending to urge the friction disc front-side against the pressure cup frontal shoulder, and thereby tending to provide a spring-actuated clutch condition appropriate for odometer traversal recording; and (l) located rearwardly of said divider and surrounding the rearward portion of said tubular mover, an electrically powerable coil and which upon the feeding of electrical current thereinto attracts the tubular mover away from the friction disc, and thereby providing an electrically-disengaged clutch condition that disables the odometer from traversal-recording.

5. The electrically-disengageable spring-actuated clutch of claim 4 wherein the tubular rearward-member is provided with an externally threaded rear-nipple and the tubular forward-member is provided with an internally threaded front-nipple.

6. The electrically-disengageable spring-actuated clutch of claim 4 wherein a rearward portion of said spring is wrapped around said saddle and a forward portion of said spring is wrapped around said tubular mover, and thereby cause torsional resistance urging the pressure cup frontal shoulder and the tubular mover forward flair toward the torsionally intervening friction disc.

* * * * *